United States Patent [19]
Lee et al.

[11] Patent Number: 5,871,618
[45] Date of Patent: Feb. 16, 1999

[54] APPARATUS FOR RECLAIMING FUEL OIL FROM WASTE OIL

[76] Inventors: Sung Rae Lee, 8-406 Kwang-Jang Apt, 28 Youido-Dong, Youngdeungpo-Ku, Seoul, Rep. of Korea; Henry Kong, 1412-102 Avenue NW., Edmonton, Alberta, Canada, T5K 0P9; Roy B. Jeffries, Box 4, Site 5, RR. #1, Cochrane, Alberta, Canada, T0L 0W0; Norman L. Arrison; Wlodzimierz P. Rzazewski, both of 11412-102 Avenue NW., Edmonton, Alberta, Canada, T5K 0P9

[21] Appl. No.: 785,591

[22] Filed: Jan. 16, 1997

[30] Foreign Application Priority Data

Aug. 28, 1996 [KR] Rep. of Korea ............... 1996 35929

[51] Int. Cl.⁶ .................... C10M 175/00; C10G 57/00
[52] U.S. Cl. ................ 196/46.1; 196/46; 196/98; 202/84; 208/179
[58] Field of Search ............... 196/46, 46.1, 98, 196/116, 139; 208/179, 181, 182, 184, 186; 202/84; 422/187

[56] References Cited

U.S. PATENT DOCUMENTS

| | | |
|---|---|---|
| 4,073,719 | 2/1978 | Whisman et al. ............ 208/180 |
| 5,141,628 | 8/1992 | Martin et al. ............... 208/184 |
| 5,225,081 | 7/1993 | Brownawell ................ 210/690 |
| 5,271,808 | 12/1993 | Shurtleff . | 
| 5,286,349 | 2/1994 | Shurtleff . |
| 5,306,419 | 4/1994 | Harrison et al. . |
| 5,527,449 | 6/1996 | Brown et al. ............... 208/179 |

FOREIGN PATENT DOCUMENTS

| | | | |
|---|---|---|---|
| 0 360 500 | 3/1990 | European Pat. Off. | C10M 175/00 |
| 0 372 276 | 6/1990 | European Pat. Off. | C10M 175/00 |
| 37 03 110 A1 | 10/1987 | Germany | C10M 175/02 |
| 41 07 294 A1 | 9/1992 | Germany | C10G 9/42 |
| 43 35 399 A1 | 4/1995 | Germany | C10G 55/06 |
| 44 05 109 A1 | 8/1995 | Germany | C10G 15/08 |
| 62-36497 | 2/1987 | Japan | C10M 175/00 |
| 1-268794 | 10/1989 | Japan | C10M 175/00 |
| 2 274 850 | 8/1994 | United Kingdom | C10G 1/04 |
| WO 92/22624 | 12/1992 | WIPO | C10M 175/00 |
| WO 92/22625 | 12/1992 | WIPO | C10M 175/00 |
| WO 94/07798 | 4/1994 | WIPO | C10M 175/00 |
| WO 95/14749 | 6/1995 | WIPO | C10L 1/08 |
| WO 95/365356 | 12/1995 | WIPO | C10M 175/00 |

*Primary Examiner*—Bekir L. Yildirim
*Attorney, Agent, or Firm*—Tilton, Fallon, Lungmus & Chestnut

[57] ABSTRACT

Disclosed is an apparatus and a process for reclaiming fuel oil from waste oil. The apparatus comprises a thermal cracking unit for cracking the high boiling hydrocarbon material into lighter, lower boiling, material so as to separate hydrocarbon vapor products from viscous materials; a condenser/heat exchanger for condensing the hydrocarbon vapor products to the liquid state; a fuel stabilization unit for chemically treating the condensates so as to give a oil product and solid sediment; and a polishing unit for forming a high quality fuel oil by physically removing solid contaminants. According to the present invention, high quality fuel oil can be obtained together with an environmentally innocuous solid ash cake, through a simple and efficient process.

8 Claims, 14 Drawing Sheets

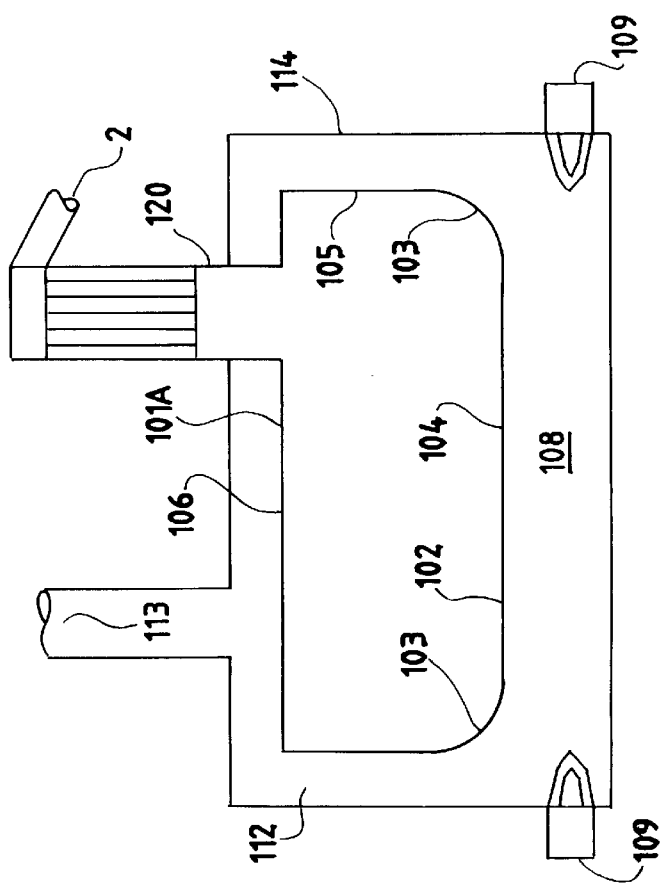

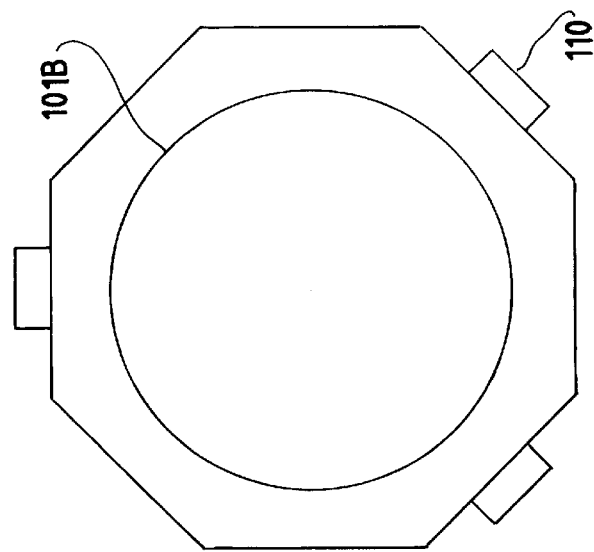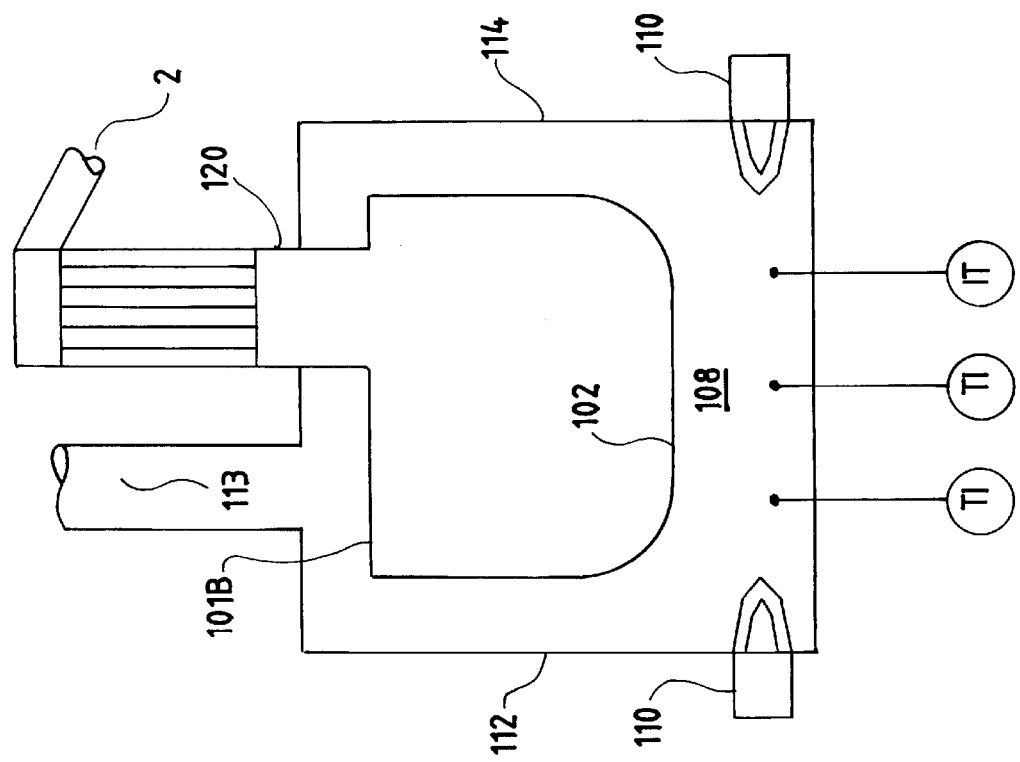

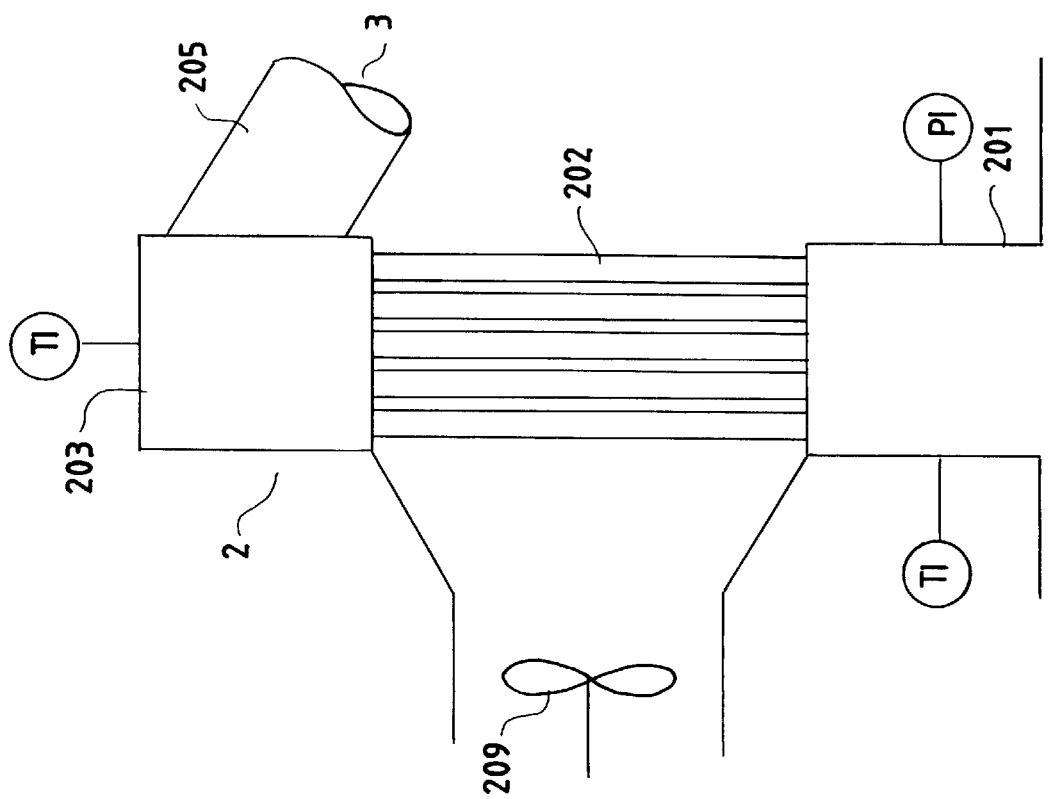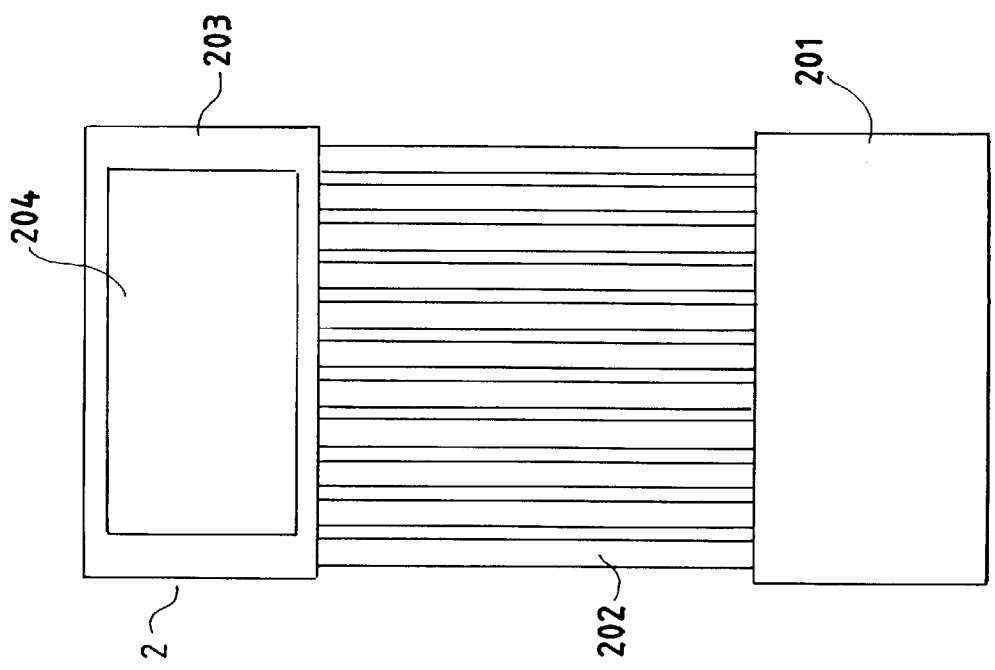

APPARATUS FOR RECLAIMING FUEL OIL FROM WASTE OIL

BACKGROUND OF THE INVENTION

The present invention relates to an apparatus and a process for reclaiming fuel oil from waste oil, and more particularly, to an apparatus and a process for turning environmentally hazardous waste lubricating oil into a high quality diesel engine fuel oil together with a relatively small amount of environmentally innocuous solid petroleum coke.

Waste lubricating oils are defined here as any lubricating oil such as engine oil, metal cutting oils and hydraulic oils.

Lubricating oil is usually produced from a certain boiling range(typically 300 to 500 degrees Celsius) cut of conventional crude oil. This material is usually called "Bright stock" and accounts for about 70% to 80% of typical lubricating oil. The remainder consists of various additives and they tend to be polymeric in nature.

Lubricating oils, while performing their job, ultimately deteriorate in their ability to satisfactorily perform any longer and have to be periodically changed out. While performing their job they pick up dirt and heavy metals both from the metal parts of the engine and from the fuels used in the engines and a typical used oil may contain significant quantities of chromium, cadmium, zinc, and lead. Break down of the hydrocarbons making up the lubricating oil can also result in lower boiling point material being present. Handling of the used oil after removal from the engine can result in light solvents being added to it along with significant quantities of water.

Therefore, used lubricating oils are environmentally hazardous and have to be treated accordingly.

The apparatus for reclaiming useful oil products from waste oil is described in, for example, U.S. Pat. No. 5,286,349 and U.S. Pat. No. 5,271,808. In the apparatus described in the above patents, a similar means of using a conventional kettle type boiler is used for recovering some of the material being boiled in the pot.

FIG. 1 is a partial diagrammatic view showing a part of the conventional apparatus for reclaiming a useful oil from waste oil.

Referring to the FIG. 1, the conventional apparatus 70 for reclaiming a useful oil product from a waste oil comprises an evaporator 80 and a condenser or heat exchanger 80. The evaporator 80 has an evaporation chamber 82 including an inlet for the waste oil, and an outlet for vaporized oil.

In the aforementioned patents, the lighter boiling components are distilled off and condensed. In the process, a significant amount of heavy material is carried over and requires a second independent distillation in an apparatus that is protected under U.S. Pat. No. 5,271,808. All of these patents are quite specific to the design details of the specific piece of machinery. They include fine detail on the construction of the equipment and control strategy. The vessel used for the cracking pot is rectangular in shape and does not have the ability to expand and contract without permanent deformation and does not produce a high quality product. Nor does it have the capability of controlling the boiling range of the product. As produced the fuel is not acceptable to a typical diesel engine, it requires significant refining before it can be so.

SUMMARY OF THE INVENTION

To solve the above problems, it is a first object of the present invention to provide an apparatus and for reclaiming fuel oil from waste oil which allows the production of a high quality diesel type fuel oil from waste lubricating oils, through a simple and efficient way.

It is a second object of the present invention to provide a process for reclaiming environmentally innocuous fuel oil from waste oil by using the above apparatus for reclaiming fuel oil from waste oil.

To achieve the first object, there is provided an apparatus for reclaiming fuel oil from waste oil, comprising: a thermal cracking unit for cracking the high boiling hydrocarbon material into lighter, lower boiling, material so as to separate hydrocarbon vapor products from viscous materials; a condenser/heat exchanger for condensing the hydrocarbon vapor products to the liquid state; a fuel stabilization unit for chemically treating the condensates so as to give a oil product and solid sediment; and a polishing unit for forming a high quality fuel oil by physically removing solid contaminants.

It is preferred in the present invention that the thermal cracking unit includes a cracking vessel having a "U" shaped vertical section.

It is preferred in the present invention that the thermal cracking unit includes a dephlegmator for controlling the boiling range of the cracked material.

It is preferred in the present invention that the apparatus for reclaiming fuel oil from waste oil according to the present invention further comprises a flare system for burning gases and noncondensable vapors taken from said condenser/heat exchanger.

It is preferred in the present invention that the fuel stabilization unit has a settling tank for separating said solid sediment.

It is preferred in the present invention that the polishing unit has a centrifugation unit for removing solid contaminants and water remaining in oil, and a filtration unit for filtering the centrifuged oil to form a high quality fuel.

It is preferred in the present invention that the filtration unit is filled with the attapulgite clay.

It is preferred in the present invention that the apparatus for reclaiming fuel oil from waste oil according to the present invention further comprises a distillation unit for controlling the boiling range of said high quality fuel.

It is preferred in the present invention that the apparatus for reclaiming fuel oil from waste oil according to the present invention further comprises a cocking unit for forming an ash cake by thermally treating the viscous materials obtained from said thermal cracking unit.

To achieve the second object, there is also provided a process for reclaiming fuel oil from waste oil, comprising the steps of: thermally cracking waste oil in the range of 380 to 420 degrees Celsius to separate hydrocarbon vapor products from viscous materials; forming a liquid condensates by condensing the hydrocarbon vapor products; chemically treating the liquid condensates to give a oil product and solid sediment; and forming a fuel oil by physically removing solid contaminants from the oil product.

It is preferred that the step of thermally cracking waste oil comprises the step of controlling the boiling range of the hydrocarbon vapor products obtained by cracking, by using a dephlegmator.

It is preferred that the step of controlling the boiling range of the hydrocarbon vapor products comprises the step of controlling the outlet temperature from the dephlegmator in the range of 250 to 280 degrees Celsius.

It is preferred that the step of forming a liquid condensates comprises the step of condensing the hydrocarbon vapor products by using an air cooled condensing heat exchanger.

It is preferred that the step of forming a liquid condensates comprises the step of controlling the flash point temperature in the heat exchanger to recover separated liquid condensates according to their boiling point.

It is preferred that the step of chemically treating the liquid condensates comprises the step of diluting the liquid condensates with an antioxidant to form a mixture having a predetermined concentration of the antioxidant, and settling solids contained in the mixture by holding up the mixture for a predetermined period.

It is preferred that the anti oxidant is dimethyl formamid, and the concentration of the antioxidant is between 0.025 and 0.035 percent on an volume basis.

It is preferred that the step of forming a fuel oil by physically removing solid contaminants from the oil product comprises the step of removing solid contaminants and water remaining in the oil by centrifuging the oil, and filtering the centrifuged oil by using a filtration medium.

It is preferred that the filtration medium is an attapulgite clay of 50 to 60 mesh particle size.

It is preferred that the process according to the present invention further comprises the step of controlling the boiling range of the fuel oil by distillating the fuel oil, after the step of forming the fuel oil.

It is preferred that the step of thermally cracking waste oil comprises the step of forming an ash cake by thermally treating the viscous materials.

BRIEF DESCRIPTION OF THE DRAWINGS

The above objects and advantages of the present invention will become more apparent by describing in detail a preferred embodiment thereof with reference to the attached drawings in which:

FIGS. 4A and 4B are cross sectional views of a cracking vessel which can be employed in the present invention.

FIGS. 5A and 5B are cross sectional views of another cracking vessel which can be employed in the present invention.

FIGS. 6A and 6B are simplified drawings of the dephlegmator.

DETAILED DESCRIPTION OF THE INVENTION

Figure 1:
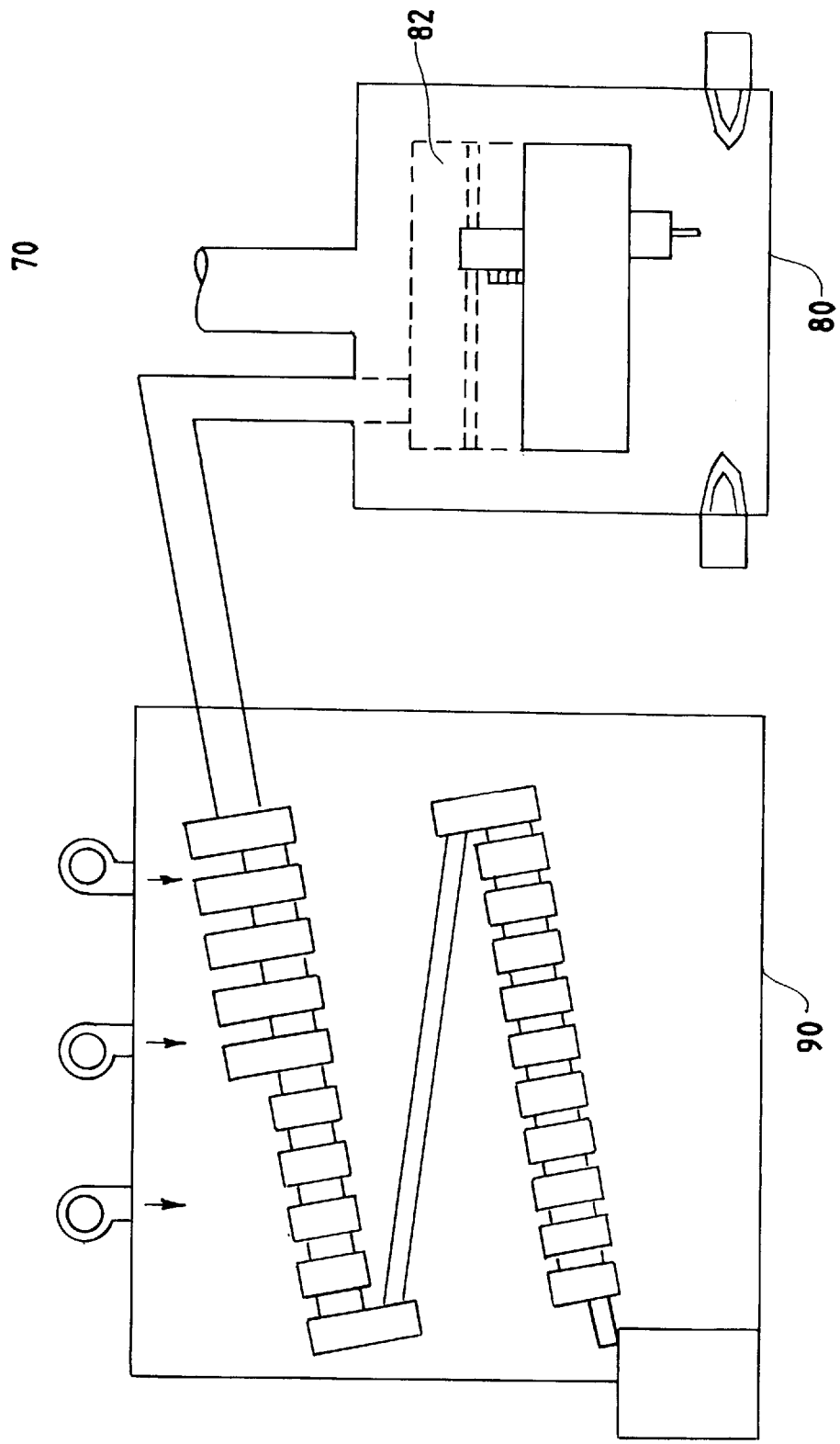
FIG. 1 is a partial diagrammatic view showing a part of the conventional apparatus for reclaiming a useful oil from waste oil.

The apparatus for reclaiming fuel oil from waste oil according to the present invention is designed to process a feedstock of any used lubricating oil such as motor oil, cutting oil or hydraulic oil into automotive fuels such as gasoline and diesel fuel. The prime product being a high quality diesel fuel that can be directly used in on-road or industrial diesel engines. The process using the present apparatus essentially consists of the following three parts: (a) a semi-continuous thermal cracking process; (b) a stabilization process of the product oil including stabilization for short term storage and stabilization for long term storage; and (c) the final polishing process. As an additive process, (d) the final distillation process and (e) the external coking process may be included.

The semi-continuous thermal cracking process according to the present invention, the used lubricating oils are thermally cracked into lighter material at elevated temperature on a continuous basis until the build up of solid-like material in the cracking vessel reaches a critical point. The vaporized lighter fractions are condensed and stored at conditions which are chosen to be optimum for the second part of the process. The remaining heavy material that would not crack and vaporize during the continuous portion of the process is treated in a batchwise manner where it is heated to a much higher temperature and turned into a coke-like material that contains excess carbon, the solid residues, and the heavy metals that were present in the original used oil. The coke is removed from the cracking vessel and can be safety landfilled. The coke has shown to be innocuous to the environment inasmuch as the tendency to leach the heavy metals from the structure is very low. Provision is also made in the thermal cracking vessel to extract this very high boiling material such that it can be cocked in an external apparatus thus making the operation of the thermal cracking process much closer to a continuous operation. It is this external coking apparatus that have been defined as the fifth part of the present process. The offgas produced during the cracking process is combusted in a flare system that is included in the design. The combusted offgas has been shown to be acceptable by meeting typical environmental standards.

According to the second feature of the present invention, the second part of the process stabilizes the cracked products from the first part of the process by chemically treating them such that olefinic materials are polymerized or alternatively treated such that the polymerization reaction is temporarily relayed. The choice of whether to perform one or the other of these processes is a function of whether or not the fuel will be used quickly after being treated. Some of this material is solid in nature and is separated out in this part of the process. This second part of the process is batchwise in nature.

The third part of the process consists of a filtration technique that takes advantage of the surface active properties of an activated attapulgite clay. The activated clay is used to remove the very small amount of tar-like material that is carried over from the thermal cracking vessel together with any remaining solid material that precipitated during the chemical treatment from part two of this oil treating process. Attapulgite clays have been used for many years in the fuel oil improving the color of diesel fuels and have the property of removing the larger molecules from the liquid passed through it. Hence, the removal of the tar and reacted olefinic material.

The fourth part of the process is a standard distillation that separates the product from the previous treatment into the correct boiling ranges required for use as motor gasoline and diesel fuel. The heavier material that falls outside the maximum for the diesel fuel is returned to the original cracking vessel where it is treated again. However, this part of the process is only necessary if a very strict control on the boiling range of the product is necessary. The primary thermal cracking process is capable of some significant degree of control of the quality of the product fuel without the need to use a separate distillation step. This control is done by limiting the maximum temperature of the produced fluids from the cracking vessel and by separating the light and heavier fuels within the product condenser.

The products from this process, then, are diesel fuel that can be directly used as fuel in a diesel engine amounting to about 90% of the original feed, about 10% material falling in the gasoline boiling range that can be added to a typical refinery gasoline pool or used to fuel the cracking vessel burners, a small amount of gasified material which is combusted in the flare system, and a solid coke-like material that can readily be landfilled. Because the process is based upon the thermal cracking of heavy hydrocarbons into lighter ones, there is an actual increase in the volume of the liquid products compared to the feed, although, of course, the weight of the product fractions equal the weight of the feed material.

The configuration of the apparatus for reclaiming fuel oil from waste oil according to the preferred embodiment of the present invention will now be described in detail with reference to the drawings.

Figure 2:
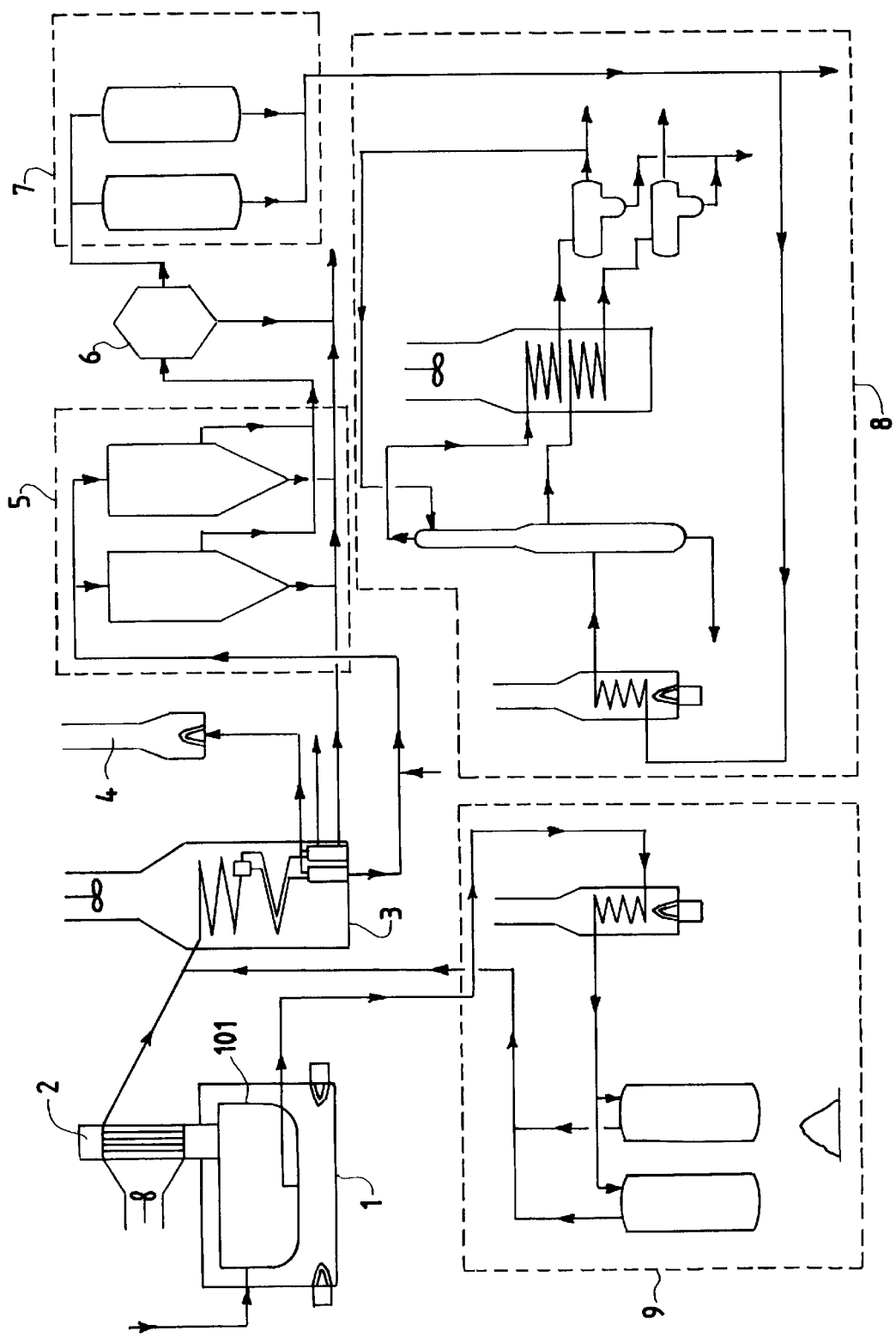
FIG. 2 is a simplified flowsheet of the process to produce a high quality diesel engine fuel according to the preferred embodiment of the present invention.

FIG. 2 shows a flowsheet of the units that make up the process required for this invention to produce a high quality diesel fuel oil from waste lubricating oil. In FIG. 2, the reference number "1" is a thermal cracking unit, the reference number "2" is a dephlegmator which is mounted directly on top of the cracking vessel 101. The vapors from the dephlegmator 2 pass to a condenser/heat exchanger 3. Non-condensable gases and vapors flow to a enclosed flare system 4. The product fuel flows from the heat exchanger 3 to a stabilization system 5. The final polishing operation is accomplished by a centrifuge 6 and a filtration unit 7. an optional final distillation system 8 and an optional external coking system 9 may be included in the apparatus according to the present invention.

Figure 3:
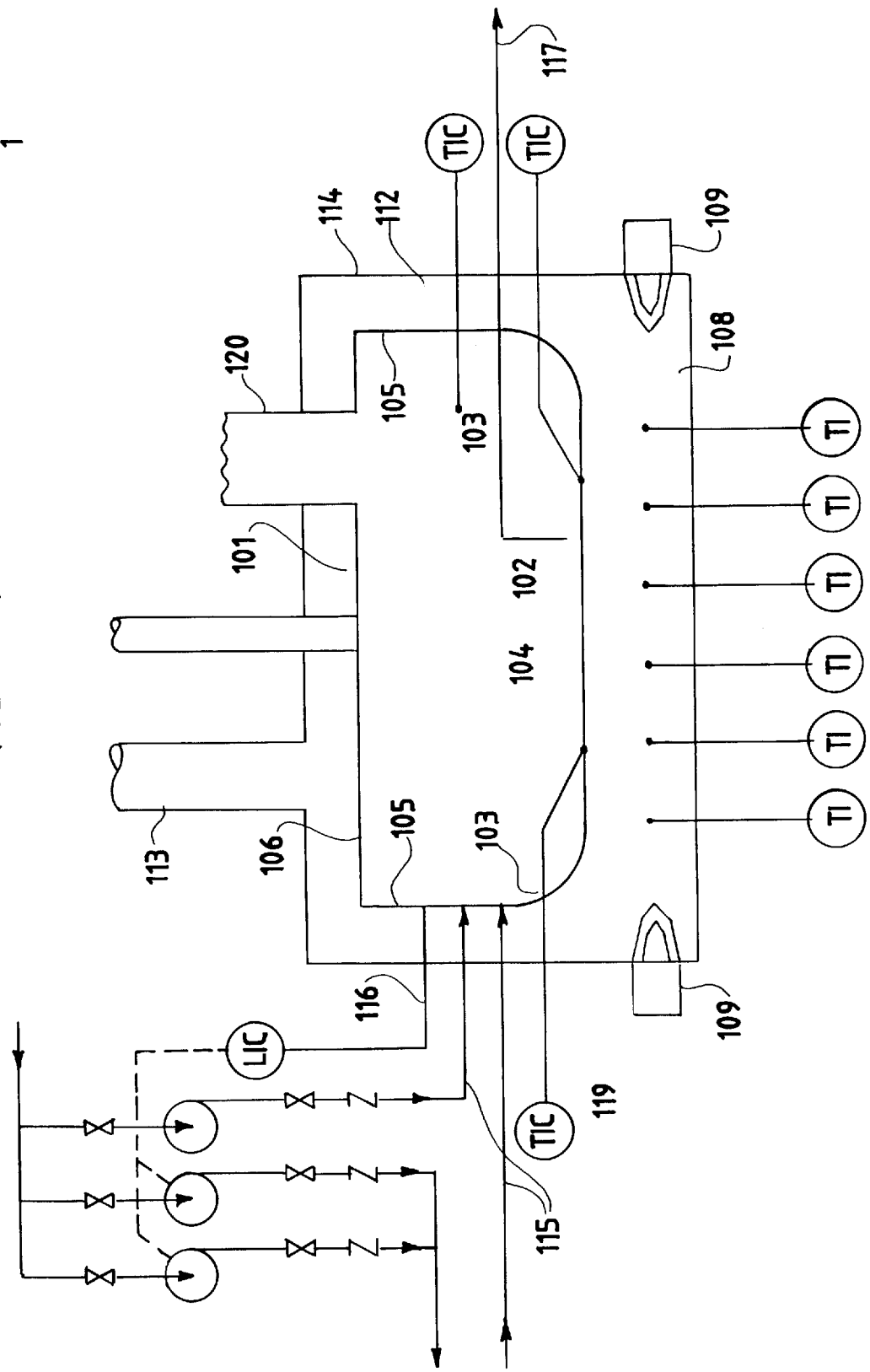
FIG. 3 is a schematic configuration of the thermal cracking unit of the present invention.

FIG. 3 shows the schematic configuration of the thermal cracking unit 1 of the present apparatus for reclaiming fuel oil from waste oil. Referring to FIG. 3, a cracking vessel 101 is fabricated from either 316L or 321L stainless steel or the equivalent specification. These materials are chosen because they give the best weldability and because they produce a minimum expansion. The bottom 102 and the side walls 105 of the vessel 101 are all butt welded for maximum strength and flexibility. The vessel bottom 102 can be either 16 or 18 mm thick and has a very shallow dished surrounding portion 103 and the central flat surface 104. Thus, the cracking vessel 101 has a generally "U" shaped vertical section.

FIGS. 4A and 4B show an example of the cracking vessel that can be employed in the present apparatus. FIG. 4A is the vertical sectional view and FIG. 4B is the horizontal sectional view.

As shown in FIGS. 4A and 4B, in case of the 5,000 ton per year unit, the bottom 102 of the cracking vessel 101A has a generally elliptical shape, and is 5,000 mm long by 2,600 mm wide and 2,250 mm high. The vertical side walls 105 of the cracking vessel 105 are welded to the bottom 102 by means of butt welds, thus forming a deep bathtub or "U" shape. The side walls 105 are 12 to 14 mm thick. The lid 106 is placed on the top of the cracking vessel 101A and welded in place by fillet welds.

FIGS. 5A and 5B show another example of the cracking vessel that can be employed in the present apparatus. FIG. 5A is the vertical sectional view and FIG. 5B is the horizontal sectional view.

As sown in FIGS. 5A and 5B, in case of the special case such as the smaller 2,500 ton per year unit, the bottom 102 of the cracking vessel 101B is circular in shape, and is fabricated from a single shallow dished end also 16 or 18 mm thick and 2,800 mm diameter.

In either case, each of the cracking vessels 101, 101A, 101B is contained within a combustion chamber 108 of height 1,000 mm containing plurality of burners. For example, in case of FIGS. 4A and 4B, 6 burners 109 are contained (only 2 burners are shown), and in case of FIGS. 5A and 5B, 3 burners 110 are contained (only 2 burners are shown). Each of the burners 109 or 110 has a heat generating capacity of 350,000 kJ per hour and can be fired with either natural gas or fuel oil. There are also an equivalent number of thermocouples T1 permanently installed in the combustion chamber 108 which are used to assist in the control of the burner firing sequence.

In FIGS. 3, 4A, 4B, 5A and 5B, the exhaust gases from the combustion chamber 108 are led from the chamber along a series of stainless steel ducts 112 that are an integral part of the cracking vessel to the exhaust chimney 113 that is mounted on top of a housing 114 containing the cracking vessel 101. The housing 114 is fabricated in two parts such that the top portion can be removed with ease to perform maintenance on the stainless steel cracking vessel 101 contained within. The vessels 101, 101A or 101B can be lifted out of the bottom portion of the housing 114 that contains the combustion chamber 108 for maintenance.

The cracking vessel 101 has inlet pipes(nor shown) for the feed oil 115, for the level transmitters 116, for the viscous residue withdrawal 117, and for plurality of thermocouples TIC (only 3 thermocouples TIC are shown in FIG. 3). One thermocouple TIC is positioned to be in the liquid and two thermocouple TIC are positioned to be attached to the bottom 102 of the cracking vessel 101.

The vaporized material leaving the cracking vessel exits via the top outlet 120 and enters the dephlegmator 2. The outlet 120 has a generally rectangular cross section.

FIGS. 6A and 6B are simplified drawings of the dephlegmator. FIG. 6A is an elevational view, and FIG. 6B is a left side elevational view of the FIG. 6A.

Referring to the FIGS. 6A and 6B, the outlet 120 from the cracking vessel 101 and the inlet 201 to the dephlegmator 2 is rectangular, 800 mm×320 mm, for the large vessel and 600 mm×260 mm for the small vessel. The center portion of the dephlegmator 2 is fabricated from a number of 48.3 mm outside diameter pipes with a length between 1,500 mm and 2,000 mm depending on space availability in the containment building. The preferred length is 2,000 mm. The top portion 203 of the dephlegmator 2 has the same cross section as the inlet 201 and 600 mm long. The top portion 203 contains a maintenance door 204 for access to clean the tubes. A transition tube 205 to the condenser/heat exchanger 3 connects to the top portion 203 and is about 457.2 mm outside diameter.

The instrumentation in the dephlegmator 2 consists of a thermocouple TI and pressure transmitter PI in the lower portion and a thermocouple TI in the upper portion. A variable speed fan 209 is provided to fine tune the temperature of the outlet 220 from the dephlegmator 2.

Figure 7A:
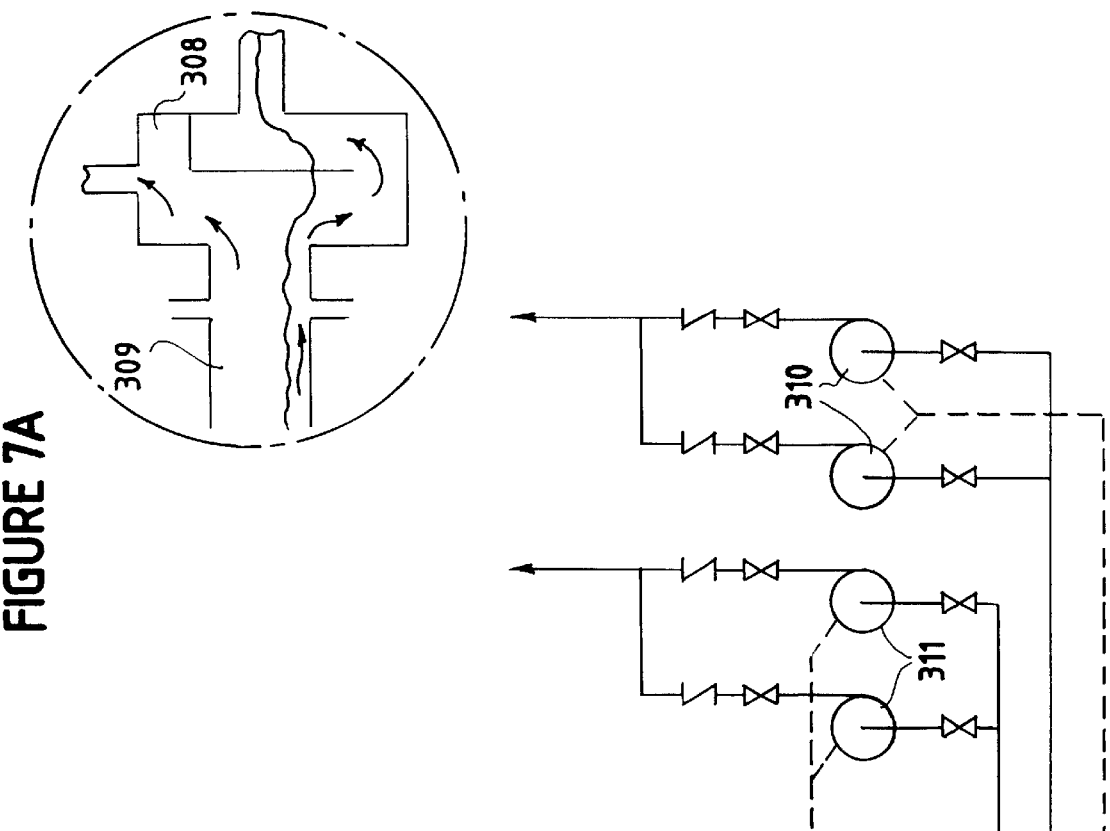
FIG. 7 is a simplified drawing of the air cooled condenser/heat exchanger of the present invention, including the means to split the diesel and light fuels.
Figure 7:
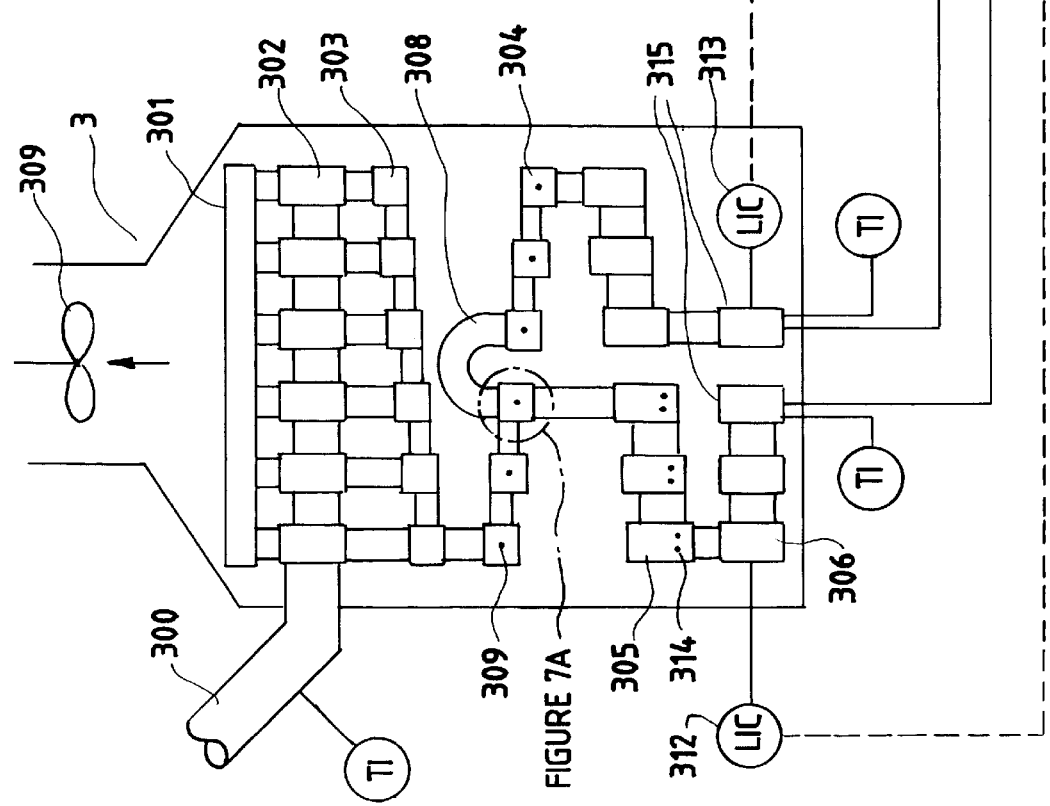

FIG. 7 shows a simplified drawing of the air cooled condenser/heat exchanger of the present apparatus, including the means to split the diesel and light fuels.

Referring to the FIG. 7, the air cooled condenser/heat exchanger 3 consists of a top row of 2 tubes 301 (only one tube is shown), 500 mm×250 mm running horizontally across the top and connected to each of the 6,500 mm×250 mm tubes 302, also running horizontal in the second row. It is into this second row that the inlet pipe 300 from the cracking vessel 101 enters and is 457.2 mm in diameter. The third row of tubes 303 are connected in series with each other and in parallel with the row above tubes 302 and are 250 mm×250 mm in cross section. The fourth row of tubes 304 are all connected in series and each have a thermocouple pocket 309 installed in one of the end plates. This fourth row of tubes 304 have a cross section of 250 mm×250 mm. One of the tubes in this fourth row is chosen to be the point at which the light and diesel fuels are separated and it is at this point that the splitter device 308 is placed. the fifth row of tubes 305 and sixth tubes 306 are 500 mm×250 mm in cross section and are connected in series. The bottom row of tubes 306 are actually the fuel collection tanks. All of the tubes 301 to 306 are 5,000 mm long for the 5,000 ton per year facility and ate 2,500 mm long for the 2,500 ton per year plant. The top two rows of tubes can be fabricated either in stainless steel or carbon steel. The remainder of the tubes 303 to 306 are fabricated in carbon steel.

The cooling fan 309 is designed to draw air from the bottom of the condenser/heat exchanger 3 to top, i.e., countercurrent flow with the oil. The outside of the condenser/heat exchanger 3 is shrouded such that the cooling air enters at the bottom of the condenser/heat exchanger 3. Two sets of pumps 310, 311 are provided to remove the product fuels from the storage tanks at the bottom of the condenser/heat exchanger 3, one set of pump 310 for light fuel and one set of pump 311 for diesel fuel. The pumps 310, 311 are operated from level switches 312, 313 in the product tanks. Three tubes 305 of the fifth row of tubes 305 are used to preheat the feed to the cracking unit 1 by means of U-tubes 314 inserted in them. Noncondensable vapors are led from the product tanks to the enclosed flare unit 4 by means of two 2" vent pipes 315. Thermocouples TI are provided at the heat exchanger inlet and in each of the storage tanks.

Figure 8:
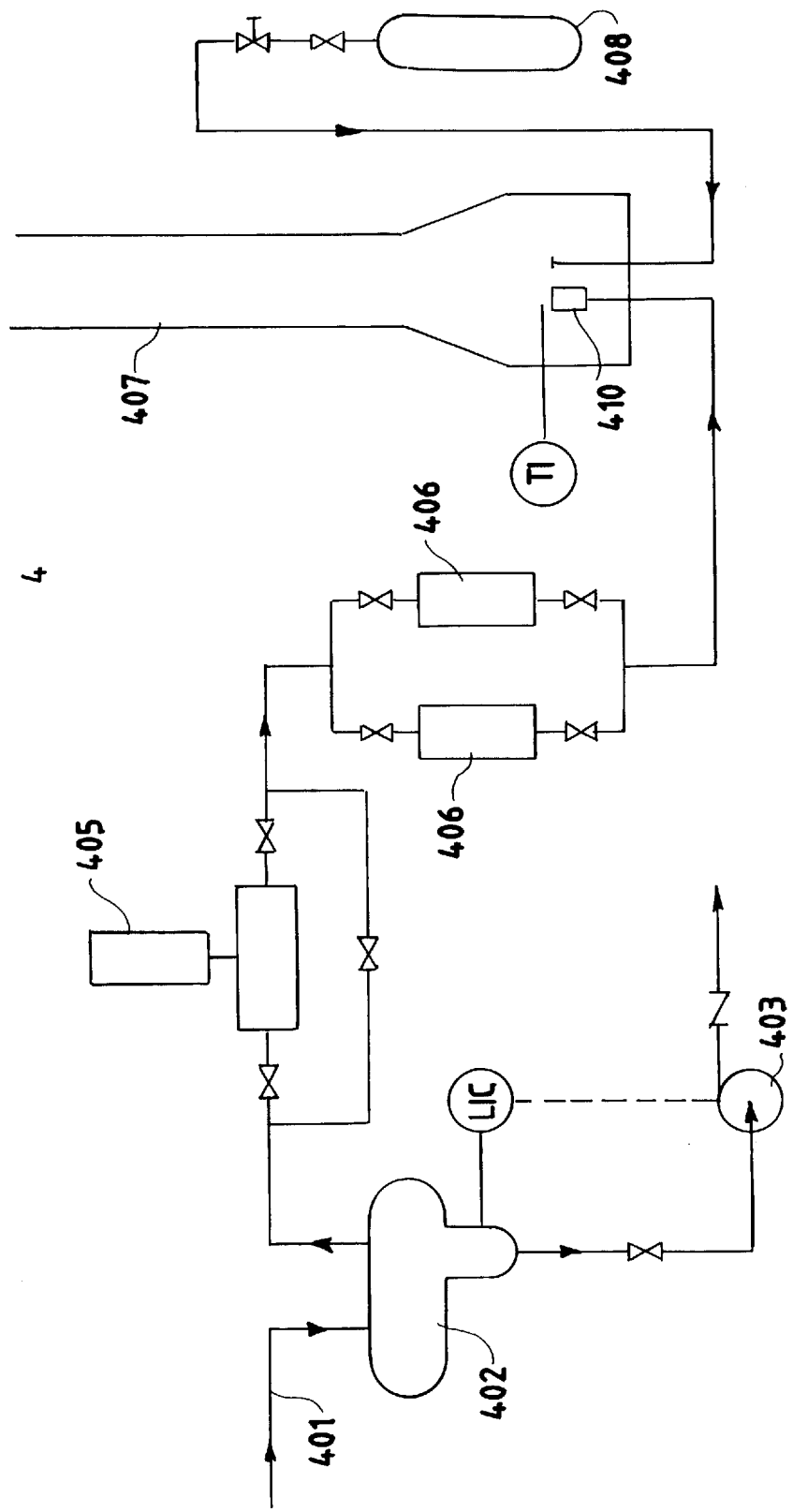
FIG. 8 is a flowsheet of the enclosed flare system which can be employed in the present invention.

FIG. 8 is a flowsheet of the enclosed flare system which can be employed in the present apparatus.

Referring to the FIG. 8, the enclosed flare system 4 is a conventional enclosed flare system and is, therefore, described only briefly. The 2" line 401 from the condenser/heat exchanger 3 enters the separator vessel 402. Liquids are pumped away by means of pump 403, to light fuel recovery. Exhaust fan 405 is used to exhaust gases from the separator vessel prior to entrance is followed by a pair of flame arresters 406 and the flare head 410. The flare head 410 is enclosed in a shroud 407 and serviced by a propane pilot system 408. The system is completed by a sparker ignition system and an thermocouple TI that the pilot is active.

Figure 9:
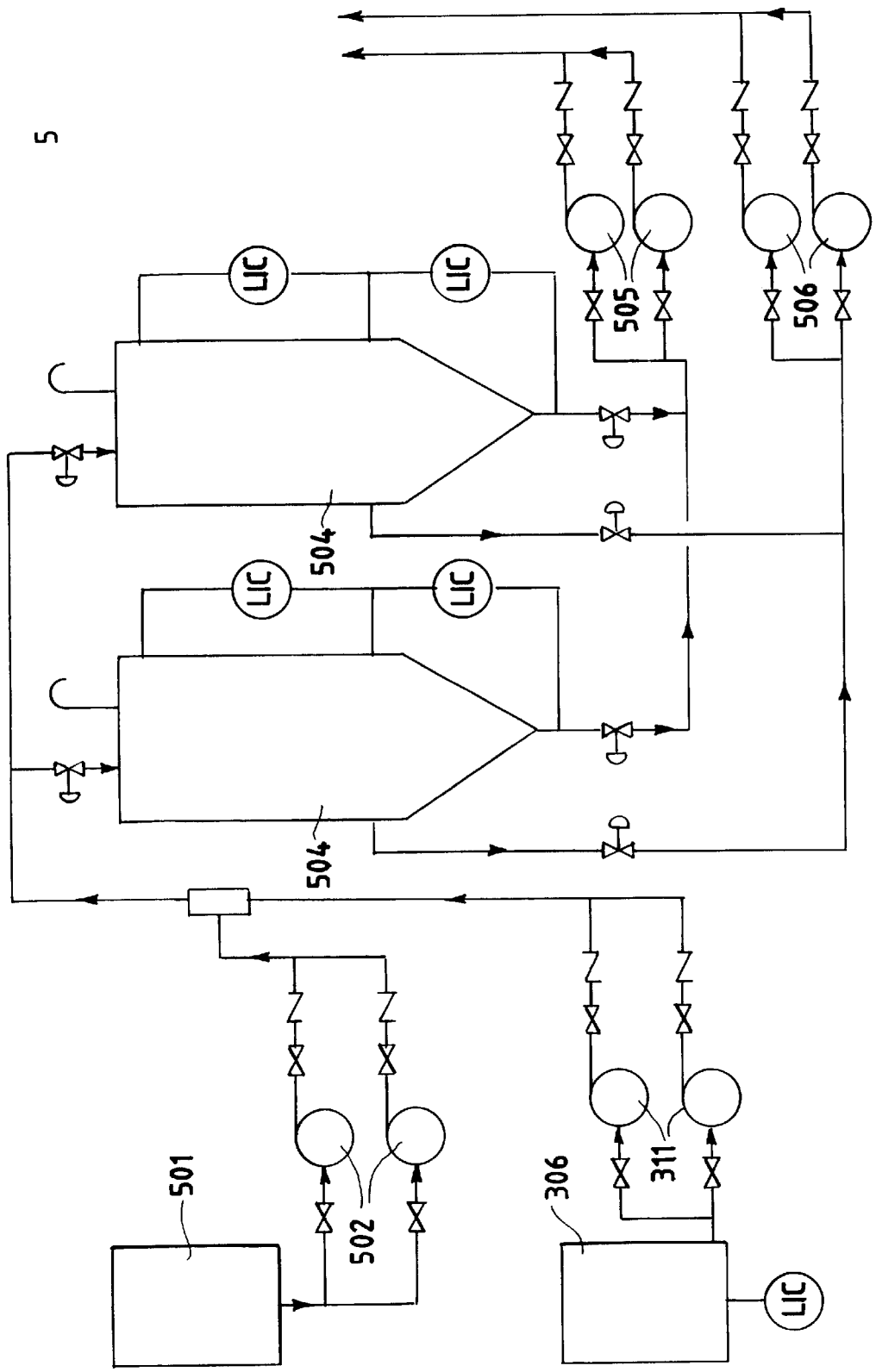
FIG. 9 is simplified flowsheets for the fuel stabilization system of the present invention, which includes two tanks for stabilization for short term storage.

FIG. 9 is simplified flowsheets for the fuel stabilization system of the present apparatus, which includes two tanks for stabilization for short term storage.

Referring to the FIG. 9, the fuel stabilization system 5 is designed to mix the stabilization chemical at a predetermined concentration and to allow the mixture to stand for about 4 hours to let the chemical reactions take place. Therefore, the size of the settling tank 504 and the associated pumps 505 and 506 will depend on how many thermal cracking units are supplying them. For a single 5,000 tonne per year unit the setting tanks 504 are about 1,800 mm diameter and a total height of about 3,200 mm of which 1,000 mm is the lower conical section. For a single 2,500 tonne per year unit the dimensions of these tanks are about 1,400 mm diameter and 3,000 mm high with a about 1,000 mm conical section. The metering pumps 502 and the water and fuel oil pumps 505 and 506 are sized appropriately.

Figure 10:
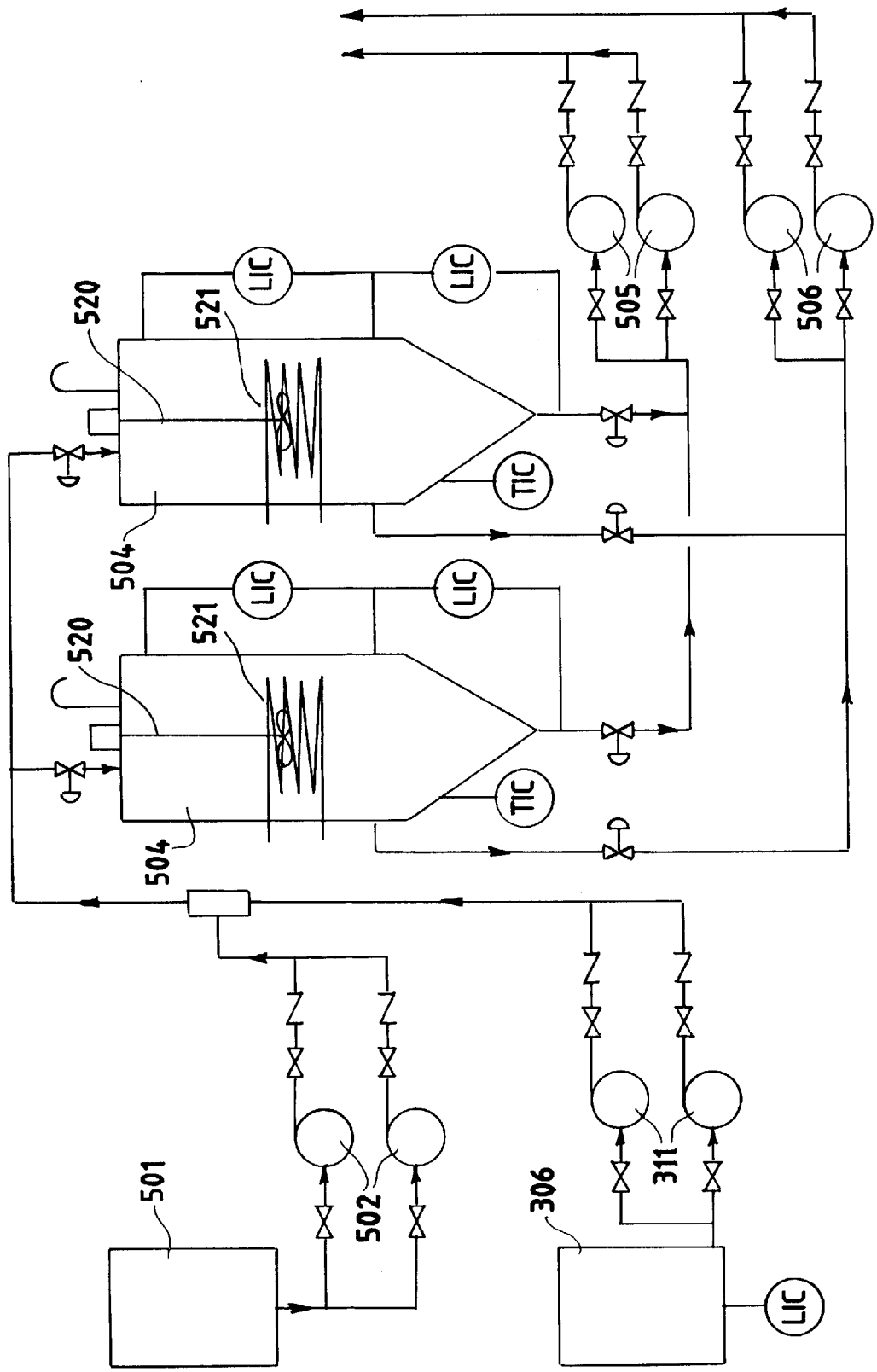
FIG. 10 is simplified flowsheets for the fuel stabilization system of the present invention, which includes two tanks for stabilization for long term storage.

FIG. 10 is simplified flowsheets for the fuel stabilization system of the present apparatus, which includes two tanks for stabilization for long term storage.

Referring to the FIG. 10, the vessel sizes are identical to those shown in FIG. 9. The only difference is the inclusion of a heating coil 521 and internal stirrer 520 in each tank 504. The pumps 502, 505 and 506 are the same size also. in FIG. 10, the components which are corresponding to those shown in FIG. 9 are represented by the same reference number as in FIG. 9.

Figure 11:
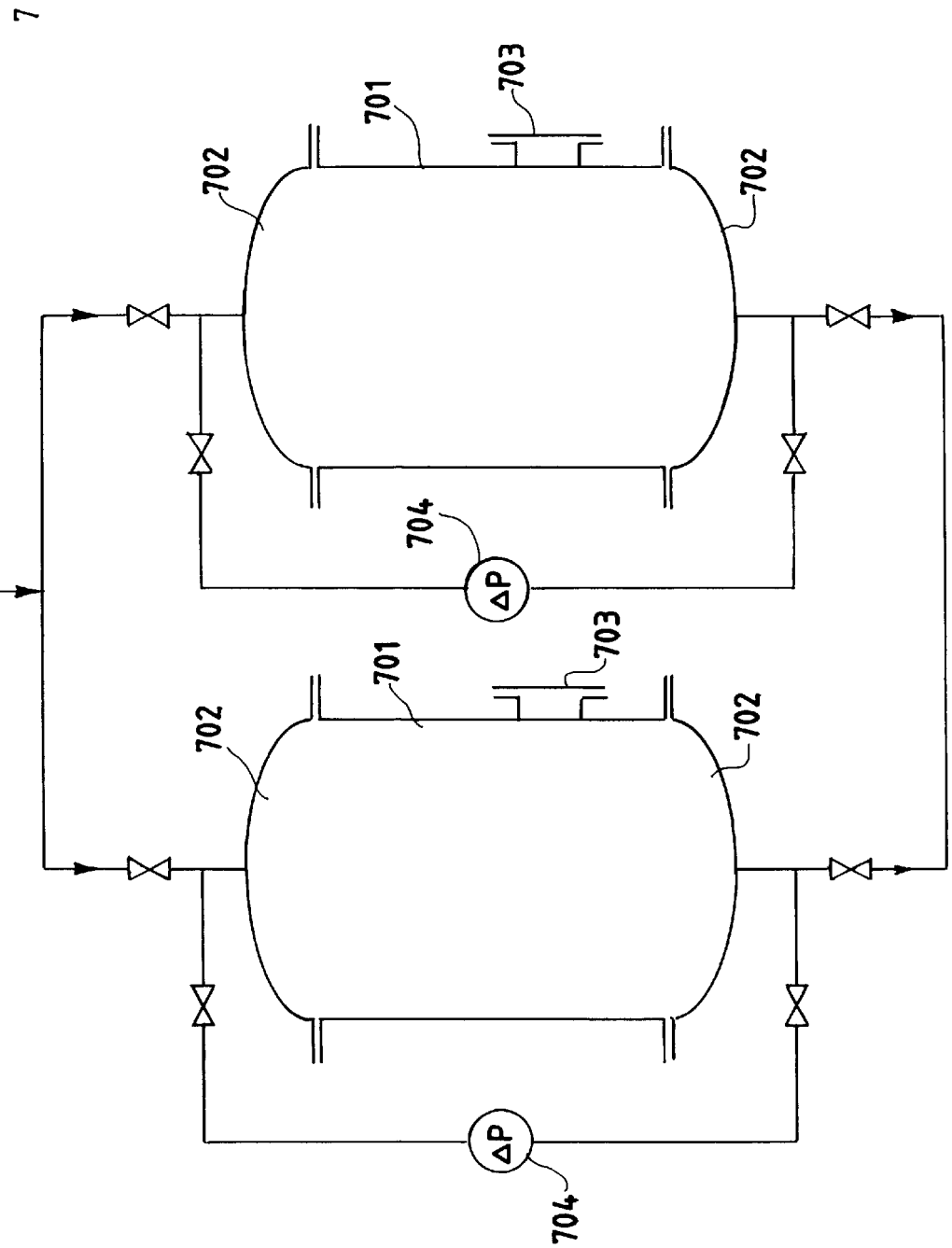
FIG. 11 is a schematic view of the final filtration unit of the present invention.

FIG. 11 is a schematic view of the final filtration unit of the present apparatus.

Referring to the FIG. 11, the filtration unit 7 comprises pressure vessels 701 designed for a maximum operating pressure of 3.0 bar gauge. They are about 750 mm diameter with a straight barrel section, about 1,200 mm long. There are removable dished ends 702 at either end. The filtration medium is removed for replacement via a side flange 703. Each filter unit has a differential pressure transmitter 704 across it with a range of zero to 2.0 bar.

Figure 12:
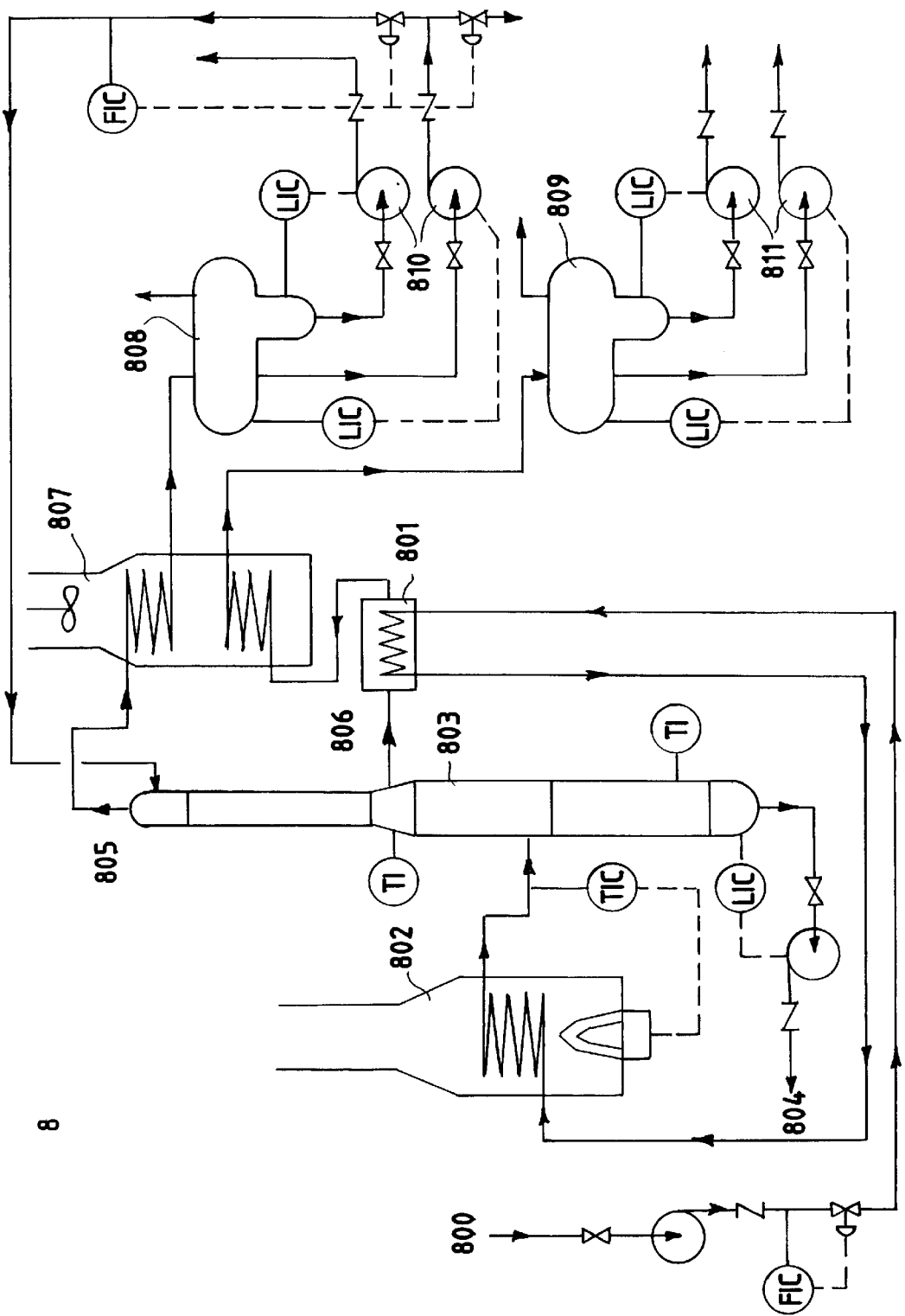
FIG. 12 is a schematic view of the optional final distillation system which can be employed in the present invention.

FIG. 12 is a schematic view of the optional final distillation system which can be employed in the present apparatus. Distillation system is a conventional distillation system which is used in most oil refinery installations and is included in the process only when a very sharp boiling range is required for the final fuel. The sizes of the equipment have to be defined specifically for each and every installation, hence there is no preferred arrangement for this part of the process.

A typical arrangement is to interchange the feed flow 800 with the product flow through a heat exchanger 801 such that heat is conserved, then to pass the feed flow to a fired heater 802 where the temperature is raised to approximately 320 degrees Celsius. The hot feed is then fed to the center of a distillation column 803 containing about 20 to 25 separate trays. Three streams are produced, a first bottom stream 804 containing the material that boils above a predetermined temperature, typically 350 degrees Celsius for a diesel distillation. A second center stream 805, the product diesel fuel, boiling in the range 150 to 350 degrees Celsius, and a third top stream 806, gasoline, boiling below 150 degrees Celsius. The second and third streams are cooled in a cooling unit 807, separated within vessels 808 and 809 from any water that might be present and pumped by pumps 810 and 811 to tankage.

Figure 13:
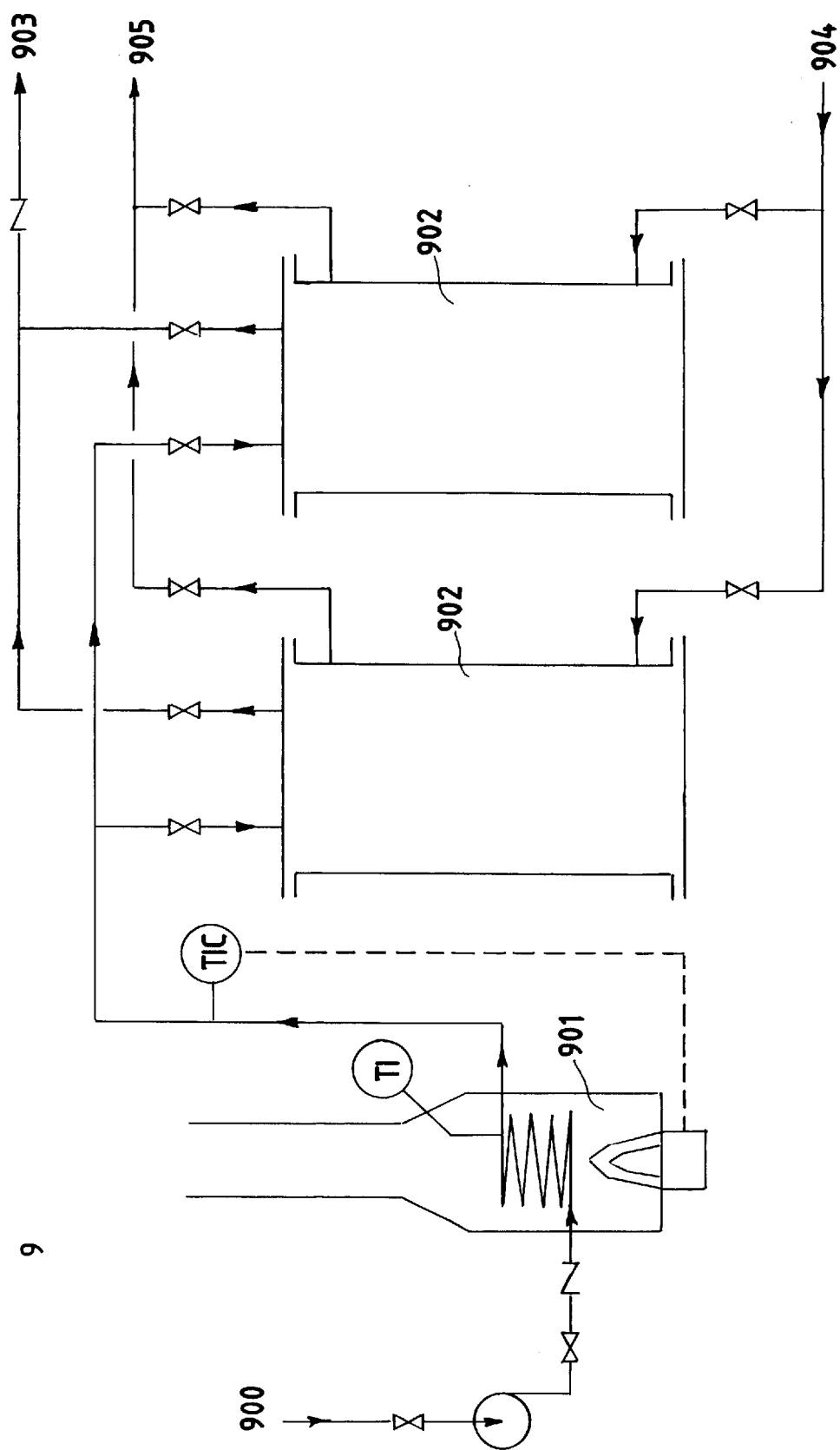
FIG. 13 is a schematic view of the conventional coking system.

FIG. 13 is a schematic view of the conventional coking system. Referring to the FIG. 13, the coking system 9 is a optional external system. This coking system 9 is also a conventional oil refinery system except in miniature. Similarly its equipment is sized specifically for each installation and there is no preferred arrangement for this process. Typically, the feed 900 i.e., the residue from the cracking vessel is fed to a fired heater 901 where it is heated to 550 degrees Celsius or so and sprayed into one of two coking drums 902. The thermally cracked vapors 903 exit the drum and are condensed in the same heat exchanger 4 used for the cracking vessel. The coke is allowed to cool and is cut out mechanically. A nitrogen purge stream 904 and an outlet 905 to the flare system complete this system.

The following is a detailed description of each of five process characterized by the present invention.

The Thermal Cracking Process

The thermal cracking process according to the present invention takes place in a stainless steel vessel that is designed to withstand the high temperature and corrosive conditions encountered during the cracking process. The vessel is fabricated from type 316L or type 321L stainless steel or the equipment specification in other parts of the world. This vessel is also designed to minimize the deleterious effects of the very high temperatures required during the process from a mechanical point of view. Hence, the vessel is designed such that thermal expansion encountered during the process is allowed to take place without causing a permanent distortion of the vessel.

According to the present invention, the cracking vessel can be instrumented as shown in FIG. 3. As mentioned earlier, all the surfaces of the cracking vessel 101 within the fired heater combustion chamber are curved to allow for this thermal expansion. The cracking vessel 101 according to the present invention is about 2.6 meters wide and about 5.0 meters long and shaped rather like a bathtub. It has a number of inlet pipes and an extraction pipe to allow the heavy residue formed during the cracking process to be extracted as required. There are a number of thermocouples attached to the bottom curved surface of the cracking vessel 101 which are used for process control purposes together with a single thermocouple that projects into the liquid contained in the vessel during the cracking process. Typically, the temperature of the liquid in the cracking vessel 101 is in the range of about 380 to 420 degrees Celsius during this thermal cracking process. The used oil feed material is pumped from the feed storage tank by means of positive displacement type pumps. The initial volume of material, to fill the vessel to approximately 50% of full, is pumped in a relatively short time with a high volume rate pump. This pump is dedicated to this purpose, i.e., as a fill pump. When the vessel is half full, the heat is applied to the vessel. The vessel is heated from below by means of oil or natural gas fired burners. When the level in the vessel starts to fall because of the vaporization taking place in the vessel, the level is automatically made up by means of a variable speed pump which is controlled by means of a level measurement and control loop from the process control computer. The bottom plate temperature of the cracking vessel 101 is monitored during the process because the temperature rises as a function of time as semi-solid material from the oil feed deposits itself on the vessel bottom. When the temperature of the bottom plate reaches approximately 520 to 560 degrees Celsius, it is the indication to stop the oil feed. The time to reach this point in the process is a function of the amount of sediment in the original feedstock material. The maximum sediment percentage defined for this process is 4% by weight on the basis of the original feedstock material, and at this level, the time duration to reach the end of the continuous part of a process cycle is in the order of 50 hours. If the quantity of sediment in the feed is less then the run time will be greater. At this point, the remaining volatile material in the vessel is boiled off. This part of the process takes approximately 10 hours. When most of the liquid in the vessel boiled off, the temperature of the bottom plate is raised to between 640 and 710 degrees Celsius. This results in the semi-solid residue that was deposited on the bottom during the cracking process is gradually burned into an ash cake, which will not be washed away. The ash cake is similar to a petroleum coke. This ash cake takes between 5 and 8 hours to form. The coking process is deemed to be complete when the hydrocarbon vapors leaving the cracking vessel are reduced to a small flow. The vessel and its' contents are then allowed to cool, initially by natural heat loss, but once the temperature of the vessel bottom has reached a temperature of 400 degrees Celsius a cooling fan is turned on to assist the cooling process. When the temperature of the vessel has reached 50 degrees Celsius, the vessel is opened to the atmosphere and personnel enter the vessel to remove the ash cake. Table 1 is a result of leachate test on solid ash cake residue. The result shows that the ash cake residue obtained by the present invention is acceptable as a landfillable material.

TABLE 1

Leachate Tests on Solid Coke Residue

| | Analysis | Leachate Criteria |
|---|---|---|
| pH | 4.0 to 4.1 | — |
| Arsenic, mg/l | <0.005 | 5.0 |
| Lead, mg/l | <0.3 | 5.0 |
| Cadmium, mg/l | <0.1 | 5.0 |
| Chromium, mg/l | <0.1 | 0.5 |
| Zinc, mg/l | 1.8 to 2.0 | — |

Table 2 is a result of solid ash cake analysis.

TABLE 2

Solid Ash Cake Analysis

| | |
|---|---|
| Arsenic, ppm wt. | 0.2 to 2.5 |
| Lead, ppm wt. | 750 to 1200 |
| Cadmium, ppm wt. | 25 to 35 |
| Chromium, ppm wt. | 85 to 120 |
| Zinc, ppm wt. | 35,000 to 65,000 |

The above cooling process for the cracking vessel and the ash cake contained therein typically takes an additional 10 hours.

Figure 14:
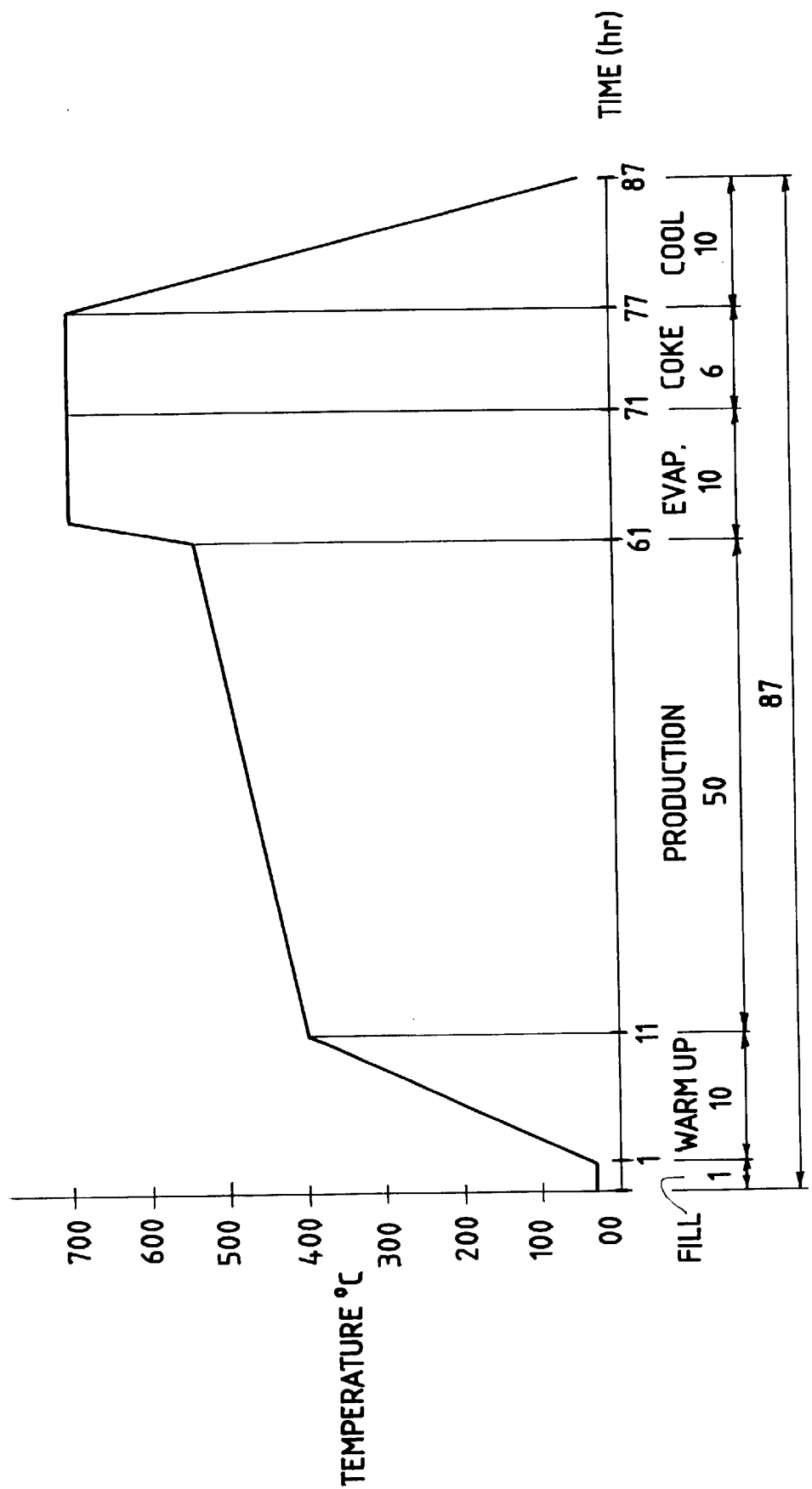
FIG. 14 is a typical time versus temperature curve for a production cycle.

FIG. 14 shows a typical time versus temperature curve for a production cycle as described above.

As mentioned earlier, it is also possible to remove the residue that settles to the bottom during the cracking process such that it can be coked in an external apparatus. This provision is made by means of a dip pipe into the bottom of the dished end of the cracking vessel. The viscous material is drawn off by means of a positive displacement pump via an air cooled heat exchanger and passed to an external delayed coking facility 9 (refer to FIG. 2).

As shown in FIG. 14, the large range of temperature variation require a vessel that is shaped to allow significant metal expansion and contraction during the process. Hence, the vessel is fabricated such that most of the surfaces are rounded and hence more able to expand and contract with little warpage of the metal.

There are actually two different sizes of vessel designed for this process. The cracking vessel 101A shown in FIGS. 4A and 4B is the large one designed for an annual throughput of 5 million liters per year, or between 900 and 1200 liters per hour. The cracking vessel 101A is oval in shape as shown in FIG. 4B.

And, the cracking vessel 101B shown in FIGS. 5A and 5B is the small one designed for an annual throughput of 2.5 million liters per year. As shown in FIG. 5B, the cracking vessel 101B is circular in shape with a diameter of 2.8 meters.

It is preferable that the cracking vessels of the present invention are designed such that they can be transported by containerized transportation, and the vessels are designed such that they can be readily removed from the support structure and fire box for easy maintenance.

One of the most important parts of this invention is that a product oil is produced that can be varied in terms of boiling range to meet most requirements without the need for a secondary distillation process. It is true that if a very tight boiling range product is desired then a final strict distillation is necessary, and we have allowed for such a thing in this invention. However, by means of the device we have called the "dephlegmator", it is possible to control the boiling point of the heaviest material allowed to pass from the cracking vessel to the condenser and hence to the product tank. This device also prevents the carry over of tar-like materials that would require a second distillation. Therefore, this invention allows a choice to be made as to the heaviest molecules produced in the oil product. It is a relatively simple control mechanism that allows a fuel similar to diesel fuel or a heating fuel to be made in demand. By limiting the overhead temperature in the dephlegmator to approximately 250 to 280 degrees Celsius, it is possible to limit the end boiling point of the product diesel fuel to about 360 degrees Celsius which is typical of a conventional diesel duel oil.

The outlet 220 temperature from the dephlegmator 2 shown in FIGS. 6A and 6B is controlled both by means of an air fan 209 and by means of the amount of heat added via the cracking vessel burners. Therefore it is possible with this invention to choose the type of diesel fuel product required.

The product condenser/heat exchanger 3 shown in FIG. 7 is a conventional air-cooled heat exchanger consisting of horizontal tubes arranged such that the air flow is counter-current to the oil flow direction. As the hydrocarbon vapors are condensed to liquid, advantage is taken of gravity to collect the liquid in a series of tubes that start from the top and finish up in a storage tank at the bottom of the heat exchanger bank. Advantage is also taken of the heat in the product oil to preheat the unprocessed feed oil to the cracking vessel. Because the product oil is a mixture of various boiling point components, and because these components condense out starting with the highest boiling materials at the top of the heat exchanger, it is also possible to control the cut-off point of the lightest hydrocarbons allowed to form part of the oil product. By selecting the appropriate point in the heat exchanger, say, 150 degrees Celsius, and separating the flow of the light and heavy material after this point, it is possible to control to some extent the amount of light material in the primary product. This process results in the production of two types of fuel product, one product that resembles a conventional diesel fuel with some degree of control on its flash point and the other a small amount of fuel similar to gasoline. Gases and noncondensable vapors are taken from the vapor space of the heat exchanger storage tanks and directed to an enclosed flare system 4 as shown in FIG. 8, where they are combusted with excess air to produce mostly carbon dioxide and water vapor together with small amounts of contaminants as shown in table 3.

TABLE 3

Air Emissions from Flare Stack

| | | |
|---|---|---|
| Carbon Monoxide | 9 to 14 mole ppm | 0.01 to 0.015 g/cu. m. |
| Sulphur Dioxide | 45 to 85 mole ppm | 0.12 to 0.22 g/cu. m. |
| NOX as NO | 30 to 40 mole ppm | 0.05 to 0.08 g/cu. m. |
| Hydrocarbon | 7 to 10 mole ppm | 0.005 to 0.007 g/cu. m. |
| Particulates | | 0.06 to 0.15 g/cu. m. |

As shown in Table 3, the quantities of these contaminants generally meet the requirements of government environmental agencies for air emission regulations.

As described above, this thermal cracking process together with the innovations of a fuel that resembles a fuel oil that is very similar to conventional diesel fuel. It is also possible to make this fuel in a one-step operation and be able to control the boiling range of the fuel such that the high temperature end point of the fuel and the low temperature end point are controlled to some degree.

Table 4 shows an analysis of a typical used feedstock and an analysis of a typical fuel oil product.

TABLE 4

Analytical Data

| | Waste Oil Feedstock | Product Oil |
|---|---|---|
| Density 15 C. g/cc | 0.90 | 0.86 |
| Viscosity 40 C. cst | 60 to 70 | 4 to 6 |
| Water % wt. | up to 4.0 | |
| Sulphur % wt. | 0.6 to 0.9 | 0.2 to 0.7 |
| Carbon % wt. | | 85 to 85.5 |
| Hydrogen % wt. | | 13.25 to 13.6 |
| Nitrogen % wt. | | 400 to 450 |
| Copper % wt. | | <0.1 |
| Chromium ppm | 1.5 | <1.5 |
| Cadmium ppm | 0.5 | <0.5 |
| Nickel ppm | | <0.1 |
| Vanadium ppm | | <0.1 |
| Lead ppm | 21 | <3 |
| Organic Chloride ppm | 400 | 90 |
| Ramsbottom Carbon % wt. | | 0.2 to 0.4 |
| Flash Point C. | >100 | <25 |
| Cetane Index | | 55 |
| Sediment % wt. | 2 to 4 | 0.05 |
| Oxidation Potential | | 30 |

The Stabilization of the Product Oil

Hydrocarbon fuels that are formed by thermal cracking result in a significant amount of chemically unstable material being contained in the product. These components are olefinic in nature and will deteriorate with storage time forming gum-like material that will result in blockage or plugging in engine components when used as fuel. The thermally cracked fuel produced in this used oil processing facility is unstable and requires chemical treatment before use in engines. Therefore, the second part of this used oil processing facility is designed to treat the unstable fuel. There are two ways to stabilize the fuel; one by temporarily slowing down the chemical reactions that take place and result in the gums being formed, and a second method where these reactions are encouraged to take place very quickly and the resulting semisolid material either filtered out or removed by distillation. Both of these methods are possible in this process.

(i) Stabilization for Short Term Storage

An antioxidant chemical is added to the product fuel as it leaves the storage tank at the bottom of the condensing heat exchanger. It is preferable to use dimethyl formamid as the antioxidant. The antioxidant is added to the product oil such that the concentration of the chemical in the oil product is between about 0.025 and about 0.035 percent on an volume basis. The antioxidant can be added either as a water solution or as an oil solution.

The treated oil is then passed to storage tank where it is held up for a period of 4 hours to allow the chemical reactions to take place. The storage tank is designed such that it has a cone shaped bottom which allows the solids formed together with any water to separate out and fall to the bottom. The product oil is taken off from the side of the tank and pumped to the final polishing operation or to final distillation if required.

FIG. 9 is the process equipment comprising a minimum of two tanks 504. Each tank 504 has 4 hours storage capacity. The water and solids residue pump is automatically operated from the water level measuring device and the product fuel oil is taken off from the side of the vessel.

(ii) Stabilization for Long Term Storage

If it is desired to store the product oil for more than a few days then it is required to prevent any further olefinic reactions to take place over time. It is then necessary to encourage the chemical reactions to take place quickly and filter out the solid products of those reactions while the oil is still in the process of being manufactured. Therefore, in this case, the fuel is pumped from the storage tank at the bottom of the condensing heat exchanger to a pair of tanks where the temperature is controlled at 90 degrees Celsius and the oil is allowed to reside for 4 hours at this temperature.

Each tank 504 shown in FIG. 10 is provided with a stirring device 520 such that the chemical and the oil is encouraged to mix thoroughly. These tanks 504 have conical bottoms to allow the solids bearing material to be drained away and the conditioned product oil is pumped to long term storage via the final polishing system.

Final Polishing Operation (i) Centrifugation

In both cases of chemical stabilization for short term storage and long term storage, a certain amount of water and solids will remain in the fuel even after 4 hours of settling time. Therefore, it is necessary to utilize the services of a high speed centrifuge to remove these last small quantities of water, especially as there is no further opportunity for its removal later.

(ii) Filtration Unit

Irrespective of which of the stabilization techniques is used to prevent solids or gums to form in the product oil, a final polishing operation is necessary to make the product oil acceptable for use directly in diesel engines, whether they be of the stationary type typically used for electrical power generation or whether they be used as on-road transportation vehicles. Therefore, the firth part of this process is a final filtration of the duel.

This final filtration process is dome through a filter medium of attapulgite clay which is used in a form of 50 to 60 mesh particles. The clay bed retains any small amounts of tar-like material or gum-like material remaining in the product oil. The clay material can be regenerated or made acceptable for land filling by placing the contaminated material inside the cracking vessel and allowed to be passed through the coking operation to form ash cake, in exactly the same way as the oil residue treatment. This operation need only be done when approximately 4 tons of contaminated clay is available.

The clay filter units 7 shown in FIG. 11 contain approximately 0.5 cubic meters of filter medium in a vessel 0.75 meters diameter and 1.2 meters long. One filter unit is designed to be in operation while the other can be maintained and be ready on standby for the on-line one when it becomes contaminated and required changing. The fuel oil leaving the filtration unit is ready for use in any diesel engine system or can be used in any conventional burner type heating system without fear of plugging fuel filters or fuel injectors or burner nozzles. A typical analysis of a product fuel is shown in the table 4.

Final Distillation

The final distillation, should it be necessary, is a conventional distillation tower technique. There is only a need for this final step if the fuel requirement has to meet the very strict requirements placed on conventional refinery made diesel fuel. If is required to have a flash point higher than approximately 25 degrees Celsius then this step is required as is the case if a very low temperature diesel fuel similar to a cold country winter diesel fuel is required, i.e., with an end boiling point of less than 340 degrees Celsius.

A typical distillation system 8 shown in FIG. 12 comprises a feed heater 802, where the feed oil is heated to about 320 degrees Celsius, followed by the distillation tower 803. The distillation tower 803 includes a number of tray stages which separate the feed material into three streams. The bottom first stream 804 being the material that boils above a predetermined maximum temperature, typically 350 degrees Celsius for a diesel distillation system. The top second stream 805 being the gasoline fraction that would boil below 150 degrees Celsius, and the middle third stream 806 being the desired diesel fuel product stream having a boiling range between about 150 and 350 degrees Celsius. These temperatures can be controlled very accurately in these types of ranges to produce three types of fuel. Each of the streams are cooled and pumped to appropriate tankage and advantage is taken to recover heat in the product stream to preheat the incoming stream.

The External Coking Operation

As mentioned earlier, it is possible to remove the viscous material from the cracking vessel during the production cycle, thereby extending the production period.

In the coking system 9 shown in FIG. 13, the viscous material 900 removed from the cracking vessel id further heated to a temperature in excess of 525 degrees Celsius in a specially designed, low residence time, heater 901 and sprayed into a stainless steel coking drum 902 where the residual material is allowed to reside at high temperature for a long time period. The lighter thermally cracked material is allowed to pass to the same heat exchanger as used by the cracking vessel where it condenses out to mostly liquids. The residual material turns into a ash cake, which has similar properties to the ash cake formed in the vessel itself. The ash cake is allowed to form in a batchwise manner and when one vessel is full, the ash cake is drilled out mechanically while the other is filling.

Next, an example operation for reclaiming fuel oil according to the preferred embodiment of the present invention will be described with reference to the drawings.

Used motor oil with the analysis shown in table 4 was fed to a thermal cracking vessel 101 and heated to a temperature of approximately 390 degrees Celsius. The time taken to reach this temperature was approximately 10 hours. When the temperature reached 390 degrees Celsius, used oil was injected into the vessel at a rate of approximately 1,000 liters per hour. The thermally cracked vapors exited the cracking vessel via tubes in the dephlegmator 2 and by means of a cooling fan 209 and by means of controlling the amount of heat applied to the burners in the firebox, the outlet temperature from the dephlegmator 2 was controlled at approximately 280 degrees Celsius. These conditions resulted in a very small amount of heavy tar material being carried over. Hence, a second distillation was not necessary to obtain a clean product, which is typical of competing technologies. The product vapors were condensed in an air cooled heat exchanger 3 and collected in a raw product storage tank at the bottom of the heat exchanger 3. The raw product oil was then pumped to a conditioning vessel 504 where a dilute mixture of dimethyl formamide and product oil was mixed such that the concentration of the chemical was 0.03% by volume and allowed to stand for approximately four hours. The product oil was then passed through a high speed centrifuge 6 where the particulates and water content of the product fuel oil was removed.

The final product oil, free of any carried over tar or gum-like material was than used directly in a diesel engine with no difficulty apparent either with the combustion properties or with plugging of the fuel filter. An analysis of the final fuel used in the diesel engine is shown in table 4. It should be noted that with the outlet temperature in the dephlegmator 2 reduced to approximately 250 degrees Celsius it is possible to reduce the end boiling point of the product oil to around 350 degrees Celsius.

It should also be noted that in this particular case the product oil was of sufficiently high quality to be used directly in diesel engine even though the filtration medium had not yet been installed. The filtration unit will make the quality even better.

While the invention has been particularly shown and described with reference to a preferred embodiment, it will be understood by those skilled in the art that various changes in form and detail may be made therein without departing from the spirit and scope of the invention.

What is claimed is:

1. An apparatus for reclaiming fuel oil from waste oil, comprising:

a thermal cracking unit for cracking the high boiling hydrocarbon material into lighter, lower boiling material so as to separate hydrocarbon vapor products from viscous materials, said thermal cracking unit including a dephlegmator for controlling the boiling point of the cracked material;

a condenser/heat exchanger for condensing the hydrocarbon vapor products to the liquid state;

a fuel stabilization unit for chemically treating the condensates so as to give a oil product and solid sediment; and a polishing unit for forming a high quality fuel oil by physically removing solid contaminants.

2. The apparatus for reclaiming fuel oil from waste oil, according to claim 1, wherein said thermal cracking unit includes a cracking vessel having a "U" shaped vertical section.

3. The apparatus for reclaiming fuel oil from waste oil, according to claim 1, which further comprises a flare system for burning gases and noncondensable vapors taken from said condenser/heat exchanger.

4. The apparatus for reclaiming fuel oil from waste oil, according to claim 1, wherein said fuel stabilization unit has a settling tank for separating said solid sediment.

5. The apparatus for reclaiming fuel oil from waste oil, according to claim 1, wherein said polishing unit has a centrifugation unit for removing solid contaminants and water remaining in oil, and a filtration unit for filtering the centrifuged oil to form a high quality fuel.

6. The apparatus for reclaiming fuel oil from waste oil, according to claim 5, wherein said filtration unit is filled with the attapulgite clay.

7. The apparatus for reclaiming fuel oil from waste oil, according to claim 1, which further comprises a distillation unit for controlling the boiling range of said high quality fuel.

8. The apparatus for reclaiming fuel oil from waste oil, according to claim 1, which further comprises a coking unit for forming an ash cake by thermally treating the viscous materials obtained from said thermal cracking unit.

* * * * *